United States Patent [19]

Kallio

[11] Patent Number: 4,936,159
[45] Date of Patent: Jun. 26, 1990

[54] MOVEMENT TRANSMISSION SYSTEM IN THE VENTILATION SYSTEM OF A VEHICLE

[75] Inventor: Mikko Kallio, Hölö, Sweden

[73] Assignee: Saab-Scania Aktiebolag, Södertälje, Sweden

[21] Appl. No.: 272,533

[22] Filed: Nov. 16, 1988

[30] Foreign Application Priority Data

Nov. 17, 1987 [SE] Sweden ............................ 8704523

[51] Int. Cl.5 .................................................. F16C 1/10
[52] U.S. Cl. ............................ 74/501.5 R; 74/501.6; 74/506
[58] Field of Search ............... 74/500.5, 501.6, 502, 74/503, 505, 506, 526, 504, 501.5 R, 479; 98/2, 208; 137/353

[56] References Cited

U.S. PATENT DOCUMENTS

| | | | |
|---|---|---|---|
| 1,902,802 | 3/1933 | Hobbs | 74/501.5 R X |
| 1,922,861 | 8/1933 | Prendergast | 74/502.6 X |
| 1,924,404 | 8/1933 | Houdaille | 74/502.4 |
| 2,224,193 | 12/1940 | Mahnken | 74/501.5 R |
| 2,633,757 | 4/1953 | New, Jr. et al. | 74/501.6 |
| 3,186,251 | 6/1965 | Quarfoot | 74/501 |
| 3,290,959 | 12/1966 | Hicks et al. | 74/501.5 R |
| 3,355,963 | 12/1967 | Barton et al. | 74/502.4 |
| 3,363,881 | 1/1968 | Kobelt | 74/506 X |
| 3,960,032 | 6/1976 | Schiff | 74/501 R |
| 4,041,797 | 8/1977 | Mito | 74/501 R |
| 4,236,422 | 12/1980 | Cochran et al. | 74/502.4 X |
| 4,813,304 | 3/1989 | Kobayashi | 74/506 X |

FOREIGN PATENT DOCUMENTS

| | | | |
|---|---|---|---|
| 1173317 | 2/1959 | France | 74/501.6 |
| 70203 | 3/1959 | France | 74/502.6 |
| 1253681 | 1/1961 | France | 74/501.6 |
| 202817 | 7/1922 | United Kingdom | 74/501.6 |
| 263567 | 1/1927 | United Kingdom | 74/500.5 |
| 935243 | 10/1959 | United Kingdom | . |
| 1020245 | 12/1962 | United Kingdom | . |
| 2060809 | 10/1980 | United Kingdom | . |
| 2123501 | 1/1983 | United Kingdom | . |

*Primary Examiner*—Rodney M. Lindsey
*Attorney, Agent, or Firm*—Nils H. Ljungman

[57] ABSTRACT

A movement transmission system is for a ventilation system of a vehicle. A manual adjustment device is located remotely from a control device for controlling the ventilation system. The manual adjustment device includes a first rotatable element which is selectively rotated in a first direction and in a second direction opposite of the first direction. The control device includes a second rotatable element which is rotatable in a third direction and in a fourth direction opposite of the third direction. A wire transmission component is disposed to extend between the manual adjustment device and the control device and includes a first wire member and a second wire member. The first wire member produces rotation of the second rotatable element in the third direction by a pulling force in response to rotation of the first rotatable element in the first direction. The second wire member produces rotation of the second rotatable element in the fourth direction by a pulling force in response to movement of the first rotatable element in the second direction. A compression spring is mounted between one of the wire members and the second rotatable element to provide tension to the first wire member and the second wire member.

10 Claims, 2 Drawing Sheets

MOVEMENT TRANSMISSION SYSTEM IN THE VENTILATION SYSTEM OF A VEHICLE

BACKGROUND OF THE INVENTION

1. Field of the Invention

The invention relates to a motor vehicle having a ventilation system including a movement transmission system in the ventilation system of the vehicle and, more specifically, to such a movement transmission system which employs a two wire configuration between a remote, manual adjustment device and a control device for controlling the ventilation system.

2. Description of the Prior Art

In the vehicle technology it is customary to transmit movement from an adjustment device arranged by the driver's seat in the vehicle to an element in a generally inaccessible location such as, for example, a control device for air distribution valves in the ventilation system of the vehicle. The transmission of movement can be accomplished both simply and inexpensively by means of a wire transmission in which a rigid wire is moved axially forwardly and backwardly in an enclosing sleeve in response to selective movement of the adjustment device. However, since the wire in these prior art designs can execute both pushing and pulling movements, the play which is experienced between the wire and the sleeve results in a form of hysteresis. When the distance between the adjustment device and the control device is short, the hysteresis does not result in any major problems. On the other hand, in the case of longer distances, the hysteresis experienced in longer wires of this type of wire transmission can be quite troublesome. Additionally, if a control device is intended to affect the movement of several air distribution valves, such a hysteresis could lead to excessively large variations in air distribution for the same setting of the adjustment device. In such cases where the hysteresis has tended to cause problems, it has not been uncommon to employ other forms of transmissions between the adjustment device and the control device such as, for example, electric or pneumatic transmissions.

However, it has been found that the components which are required for these other forms of transmissions are both complicated and expensive. As a result, they have been primarily used in more advanced ventilation systems such as, for example, entirely automatic ventilation systems.

OBJECTS OF THE INVENTION

It is an object of the present invention to provide an accurate, reliable wire transmission system in which the problems with hysteresis are either eliminated or at least reduced to a tolerable level.

It is a further object of the invention to provide such a wire transmission system that is simple and inexpensive to produce and assemble.

It is another object of the invention to provide such a wire transmission system that does not require frequent adjustments or the like.

SUMMARY OF THE INVENTION

These and other objects of the invention are achieved in a preferred embodiment thereof including a movement transmission system for a ventilation system of a vehicle. A manual adjustment device is for being adjusted by hand and a control device is for controlling the ventilation system. The control device is located in the vehicle remote from the manual adjustment device. The manual adjustment device includes a first movable element which is selectively movable in a first direction and in a second direction opposite of the first direction. The control device includes a second movable element which is movable in a third direction and a fourth direction opposite of the third direction. A wire transmission element is disposed to extend between the manual adjustment device and the control device and includes a first wire member and a second wire member. The first wire member is connected between the first movable element and the second movable element for producing movement of the second movable element in a third direction in response to movement of the first movable element in the first direction. The second wire member is connected between the first movable element and the second movable element for producing movement of the second movable element in the fourth direction in response to movement of the first movable element in the second direction.

More specifically, the preferred embodiment includes at least one of the first movable element and the second movable element being mounted for rotation so that the wire ends of the first wire member and the second wire member are respectively wound at least partially around the rotatable first movable element and/or the rotatable second movable element in opposite directions. The preferred wire ends are flexible so that the rotational movement is respectively produced by a pulling force on the first wire member and the second wire member.

The preferred movement transmission system in the ventilation system of a vehicle comprises a control device by means of which the ventilation system can be controlled or adjusted. A wire transmission is connected, at one end, to the control device and, at the other end, is connected to an adjustment device by means of which the control device can be remote-controlled via the wire transmission. The wire transmission comprises two wire units each consisting of a wire accommodated in a sleeve. The respective wires of the two wire units are fixed to the adjustment device and the control device in directions opposite to each other. At least one of the wire units comprises a spring which exerts a stretching force on the wires.

The movement transmission system is further characterized by the wire units each comprising a separate wire each accommodated in a sleeve or by the wire units being made up of a sleeve which accommodates a common wire for both the wire units.

The preferred movement transmission system may also include the wires being made of a readily flexible material which only permits transmission of pulling forces.

In the preferred embodiment, the one wire is firmly attached, at its one end, to the control device and, at its other end, is firmly attached to the adjustment device The second wire is firmly attached, at its one end, only to either one of the control device or the adjustment device and, at its other end, is connected to the control device or the adjustment device via the spring. The spring is preferably a compression spring.

It should finally be noted that, in the preferred movement transmission system, the control device and the adjustment device are designed to execute rotational movements. As a result, the control device and the adjustment device comprise elements around which the wires are wound, wherein the wires are respectively wound around the elements in directions opposite to each other.

By using two wires according to the invention, during operating movements, one of the wires at all times executes a pulling movement while the other wire simply follows the movement. The hysteresis which is found in known wire transmissions, due to the fact that one and the same wire alternatingly executes pulling and pushing movements, has thus been eliminated. The spring according to the invention also ensures that both wires are constantly kept stretched and that the control device will always assume a predetermined position relative to the adjustment device. The spring thus eliminates the requirement for possible readjustment of the extension of the wires.

DESCRIPTION OF THE PREFERRED EMBODIMENT

Figure 1:
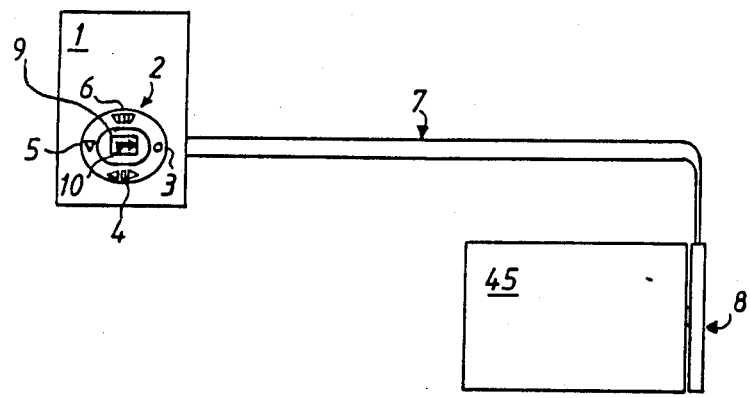
FIG. 1 shows a basic, simplified view of a typical ventilation system in which the preferred movement transmission system can be installed according to the invention between a remote, manual adjustment device and a control device.

FIG. 1 shows a basic design of a typical ventilation system in a vehicle and, more specifically, an arrangement for adjusting different ventilation air valves.

Near the driver's seat in the vehicle there is arranged, on an instrument panel 1, a manual adjustment device 2 for setting various ventilation positions 3, 4, 5, 6. The adjustment device 2 is connected by a preferred wire transmission 7 to a pivotable or rotatable control device 8 which in turn is designed to set air valves, incorporated in the ventilation system, to different positions The adjustment device 2 is attached on a bearing to the instrument panel 1 and has, on the front of the instrument panel 1, a knob 9 which is pivotable within a 270° range. The one end position 3 of the manual adjustment device 2 corresponds to the air valves being completely closed. In the closed position 3, an indicating arrow 10 on the knob 9 is directed towards a symbol 0 on the instrument panel 1.

The adjustment device 2 has a second position 4 which is located at a 90° angle clockwise from the closed position 3. This second position 4 corresponds, for example, to the air valves being set to direct all the ventilation air to panel outlets (not shown) on the instrument panel. The second position 4 is identified on the instrument panel 1 by a symbol which is customarily used to show panel ventilation and consists of two arrows pointing in opposite directions.

The manual adjustment device 2 has a third position 5 which is located at a 90° angle clockwise from the second position 4. The third position 5 corresponds to the air valves being set to direct all the ventilation air to floor outlets (not shown) on the floor of the vehicle. The third position 5 is typically identified on the instrument panel 1 by a symbol including an arrow directed downwardly.

The adjustment device 2 has a fourth position 6 which is located at a 90° angle clockwise from the third position 5. The fourth position 6 corresponds to the air valves being set to direct all the ventilation air to defroster outlets (not shown) at the vehicle windscreen. The fourth position 6 is identified on the instrument panel 1 by a symbol which is customary for this purpose and includes, for example, three smaller arrows directed upwardly.

Although not shown in the figures, the preferred manual adjustment device 2 can include any type of stop elements known in the control art to prevent it from being turned beyond the desired 270 degrees of pivoting range. On the other hand, it should be noted that the preferred adjustment device 2 can be set at intermediate positions between the specific positions 3, 4, 5, 6, at which positions the air valves are set so that the air is distributed in proportion to the affected air outlets. In order to facilitate such selective setting, the adjustment device 2 can be designed in a manner known in the control art to include a number of different predetermined positions which comprise both the above-mentioned defined positions 3, 4, 5, 6 and various positions therebetween.

Figure 2:
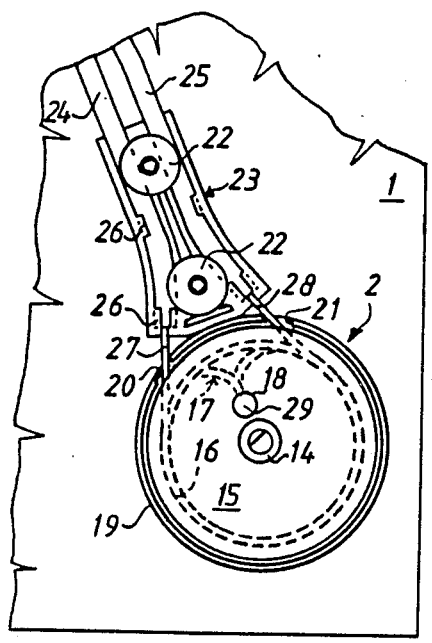
FIG. 2 shows an enlarged, fragmentary view of the preferred manual adjustment device of FIG. 1 including various features of the invention.

FIG. 2 includes a more detailed view of the adjustment device 2 as it would appear from behind the instrument panel 1 of FIG. 1. The knob 9 located on the front of the instrument panel 1 is fixedly connected, through an axle 14, to a cable wheel 15 on the rear side of the instrument panel 1 to cause the cable wheel 15 to be selectively rotated with the knob 9. The cable wheel 15 is provided with a groove 16 on its circumferential surface. The cable wheel 15 also includes a radial recess 17 which extends from the circumferential surface to terminate radially inwardly at an essentially cylindrical space 18 with an axial extension. The cable wheel 15 is surrounded, about its circumference, by a protective cylindrical flange 19 which is fitted firmly to the rear of the instrument panel 1. The flange 19 is designed with two radial openings or recesses 20, 21.

On the rear of the instrument panel 1 there is also fixed, by means of two screw joints 22, a preferred holding fixture 23 designed with two longitudinal grooves into which pass the ends of two wire sleeves 24, 25. The holding fixture 23 includes a number of integral guides 26 which position the wire sleeves 24, 25 in the grooves. The wire sleeves 24, 25 are clamped against the holding fixture 23 by means of the same screw joints 22 which position the holding fixture 23 relative to the instrument panel 1. Projecting respectively from the wire sleeves 24, 25 are two wires 27, 28 which respectively extend through the recesses 20, 21 in the flange 19. The wires 27, 28 are located in the groove 16 of the cable wheel 15 as they are wound relative to each other in opposite directions. The respective terminal ends of the two wires 27, 28 are attached to a common, conventional cylindrical wire stop 29, which is mountably secured in the cylindrical space or recess 18 of the cable wheel 15. The wires 27, 28 are made of material which makes them readily flexible and may include a number of steel cables or strands which are twisted together. As will be clear from the description, it is advantageous for the present invention to include the wires 27, 28 which can only transmit pulling movements and, thus, can never transmit pushing movements. Since the wires 27, 28 are readily flexible, they can be wound around the cable wheel 15 even when its diameter is small. The two wires 27, 28 are accommodated in the same groove 16 in the cable wheel 15. The one wire 27 may extend, according to the position of the knob 9 shown in FIG. 1, as little as approximately half a turn around the cable wheel 15, while the second wire 28, may extend as little as approximately one and a half turns. Preferably, however as seen in FIG. 2, the wire 27 extends about three-fourths of a turn around the cable wheel 15 while the wire 28 extends about one and three-fourths of a turn.

Figure 3:
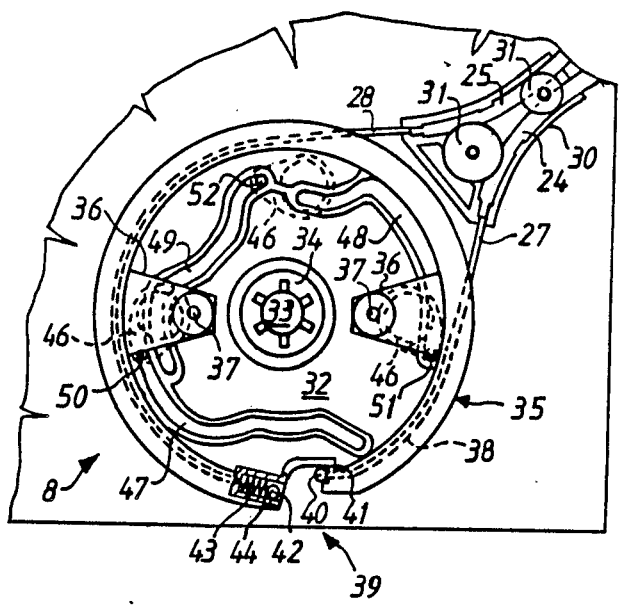
FIG. 3 shows an enlarged, fragmentary view of the preferred control device of FIG. 1 including various features of the invention.

The other ends of the wires 27, 28 are respectively attached to the control device 8 shown in greater detail in FIG. 3. There is in the control device 8, similar to what has been described above a preferred holding fixture 30 for the respective other ends of the wire sleeves 24, 25. In the holding fixture 30, the wire sleeves 24, 25 and the holding fixture 30 are positioned relative to each other and to a structural portion of the vehicle by means of two screw joints 31.

The control device 8 comprises a cam disc 32 which is rotatably mounted on an axle 33 which is fixedly mounted to the structural portion of the vehicle. The cam disc 32 is axially positioned on the axle 33 by a collar (not shown) on the back side of the cam disc 32 and on the front side by a locking washer 34 attached to the axle 33.

The cam disc 32 is surrounded by a generally ring-shaped cable drum 35 having two attachment brackets 36 directed radially inwardly. The attachment brackets 36 respectively include a hole (not shown) for receiving a clamping screw 37 therethrough. The clamping screws 37 are attached to the cam disc 32 and position the cable drum 35 relative to the cam disc 32. The holes are designed to allow, upon assembly, a certain adjustment of the relative rotational position between the cam disc 32 and the cable drum 35 before the clamping screws 37 are fully tightened.

The cable drum 35 is designed with an external groove 38 which is interrupted by a radial recess 39. Projecting respectively from the other ends of the respective wire sleeves 24, 25 are the other ends of the wires 27, 28. The ends of the wires 27, 28 lie in the groove 38 of the cable drum 35 and extend in the opposite directions relative to each other around the cable drum 35. The one wire 27 is attached, at its end, to a wire stop 40 which bears directly against a pocket 41 designed in the recess 39. The other wire 28 is also attached, at its end, to a wire stop 42 which bears against a compression spring 43 extending around the wire 28. The compression spring 43 is positioned in a cavity or hole 44 extending tangentially from the recess 39 with the compression spring 43 bearing against the bottom of the hole.

The respective lengths of the wires 27, 28 between the wire stops 29, 40, 42 are adapted relative to the compression spring 43 so that the compression spring 43, when it is fitted in the hole 44, is slightly compressed. The compression spring 43 thus exerts a pushing force against the wire stop 42 which attempts to turn the control device 8 to a position at which both of the wires 27, 28 are held stretched to a similar extent. Consequently, the control device 8 always assumes a predetermined position relative to the particular position of the manual adjustment device 2.

FIG. 1 shows schematically a ventilation housing 45 to which all the ventilation air is directed. From the ventilation housing 45, channels (not shown) project to various air channels or outlets respectively arranged on the instrument panel, floor and windscreen of the vehicle. Each of these channels includes an air valve (not shown), the rotational position of which adjusts the flow of the air through the respective channel. Accordingly, each air valve is connected to a lever 46 through which rotation of the respective air valve is achieved. The rotation of the three levers 46 is respectively produced by the cam disc 32 shown in FIG. 3.

The preferred cam disc 32 includes three guide grooves 47, 48, 49 having both radial and tangential extensions. Each guide groove 47, 48, 49 respectively receives a guide pin 50, 51, 52 therein. Each of guide pin 50-52 is connected to one of the levers 46 to produce the rotation of the air valves. The guide pins 50-52 are thus eccentrically orientated on their respective levers 46. The rotation of the air valves is thus produced by rotation of the cam disc 32, as the guide pins 50-52 running in the guide grooves 47-49 assume different predetermined positions for corresponding positioning of the levers 46 connected to the guide pins 50-52 and the air valves. As a result, for each rotational position of the cam disc 32 there is a corresponding predetermined position of each of the ventilation valves. As discussed above, the cam disc 32 is fixedly connected to the cable drum 35 which is used to turn the cam disc 32.

The rotation of the cable drum 35 is produced by the remote, manual adjustment device 2, located on the instrument panel 1, through the preferred wire transmission 7. When the knob 9 of the adjustment device 2 is turned, the cable wheel 15 turns. One of the wires 27, 2$ is then subjected to a pulling force, while the other wire 27, 28 is subject to a pushing force. However, since the wires 27, 28 are readily flexible, the pushing force does not transmit any movement to the control device 8. On the other hand, the wire 27, 28 subjected to the pulling force exerts, at its other end, a force on the control device 8 which causes it to turn. As soon as the control device 8 is turned, the control device 8 exerts a pulling force on the other wire 27, 28 which follows the rotational movement without itself having a force-transmitting effect. Thus, the transmission of movement from the remote, manual adjustment device 2 to the control device 8 is always effected only by a pulling wire 27, 28, where the two wires 27, 28 are alternatingly subject to pulling forces, depending on the direction in which the adjustment device 2 is turned.

Since one of the wires 27, 28 which does not directly transmit any movement nevertheless follows the movement and, moreover, is at all times kept stretched by the compression spring 43, there is no play in the wires 27, 28 which can cause any hysteresis. The transmission of the movements from the rotational adjustment device 2 to the rotated control device 8 can therefore take place with great accuracy.

The invention can be modified within the scope of the subsequent patent claims and can be designed other than as illustrated in the description.

Instead of the adjustment device and control device being rotatably arranged as in the preferred embodiment, one or both of them can be designed to execute linear movements. The essential point for the invention is only that the wires are arranged to transmit movements in either, opposite direction.

Instead of arranging the spring in the control device as in the preferred embodiment, it can be arranged in the adjustment device in alternative embodiments. However, the spring is preferably designed as a compression spring which produces tension on the wires in the manner described. Should high operating forces be required, the movement can always be transmitted when the spring has bottomed. However, this does not exclude the possibility of designing the spring as a tension spring which is arranged in series with one of the wires. However, this would mean that a more complicated arrangement would be required to ensure proper operations at high operating forces.

In the preferred example, two completely separate wires 27, 28 are shown which are firmly connected to each other at the wire stop 29 of the cable wheel 15. In alternative embodiments, the two wires 27, 28 can in practice be made of a single long wire which is firmly connected in an analogous manner to the cable wheel 15 or an equivalent. In further alternative embodiments, it is possible to use only frictional forces for the attachment of the wire to such a cable wheel, which can be achieved if the wire is wound several turns around the cable wheel. With such a configuration, it would be possible for the cable wheel to be turned several turns during the adjustment movements.

Additional modified embodiments are also possible within the concept of the invention. The invention as described hereinabove in the context of a preferred embodiment is not to be taken as limited to all of the provided details thereof, since modifications and variations thereof may be made without departing from the spirit and scope of the invention.

What is claimed is:

1. A movement transmission system for a motor vehicle ventilation system comprising:
   a manual adjustment device;
   a control device for controlling said ventilation system;
   said manual adjustment device including a first movable element which is selectively movable in a first direction and in a second direction opposite of said first direction;
   said control device including a second movable element which is movable in a third direction and in a fourth direction opposite of said third direction;
   a wire transmission means disposed to extend between said manual adjustment device and said control device;
   said wire transmission means including a first wire means and a second wire means, each of which have opposite wire ends being respectively secured relative to said first movable element and said second movable element;
   said first wire means being connected between said first movable element and said second movable element and capable of being placed in tension for pulling said second movable element in said third direction in response to movement of said first movable element in said first direction;
   said second wire means being connected between said first movable element and said second movable element and capable of being placed in tension for pulling said second movable element in said fourth direction in response to movement of said first movable element in said second direction,
   first sleeve means extending along at least a portion of said first wire means for positioning said first wire means with said first wire means being relatively movable with respect to said first sleeve means;
   second sleeve means extending along at least a portion of said second wire means for positioning said second wire means with said second wire means being relatively movable with respect to said second sleeve means;
   compression spring means positioned between at least one of said wire ends of said first wire means and said second wire means and at least one of said first movable element and said second movable element;
   said first wire means and said second wire means being flexible;
   said compression spring means being mounted on said second movable element at said wire end of said first wire means; and
   said compression spring means being positioned at least partially circumferentially around said second movable element.

2. The movement transmission system for a motor vehicle ventilation system according to claim 1, wherein said first wire means includes a first wire mounted for sliding movement within said first sleeve and having said opposite wire ends of said first wire means, said second wire means includes a second wire mounted for sliding movement within said second sleeve and having said opposite wire ends of said second wire means, and each of said first sleeve and said second sleeve includes opposite ends which are respectively secured to said control device and said manual adjustment device.

3. The movement transmission system for a motor vehicle ventilation system according to claim 2, wherein said compression spring is capable of being completely compressed during said movement of said second movable element in said third direction.

4. The movement transmission system for a motor vehicle ventilation system according to claim 2, wherein said first movable element is mounted for rotation in said manual adjusting device and said movement in said first direction and said second direction is rotational movement.

5. The movement transmission system for a motor vehicle ventilation system according to claim 4, wherein said wire ends of said first wire and said second wire are respectively wound at least partially around said first movable element in opposite directions.

6. The movement transmission system for a motor vehicle ventilation system according to claim 2, wherein said second movable element is mounted for rotation in said control device and said movement in said third direction and in said fourth direction is rotational movement.

7. The movement transmission system for a motor vehicle ventilation system according to claim 6, wherein said wire ends of said first wire and said second wire are respectively wound at least partially around said second movable element in opposite directions, said rotational movement of said second movable element in said third direction is in response to said pulling force by said first wire, and said rotational movement of said second movable element in said fourth direction is in response to said pulling force by said second wire.

8. The movement transmission system for a motor vehicle ventilation system according to claim 7, wherein said compression spring is capable of being completely compressed during said rotational movement of said second movable element in said third direction.

9. The movement transmission system for a motor vehicle ventilation system according to claim 7, wherein said ventilation system includes means for regulating flow of ventilation air, said means for regulating includes at least one positioning element, said second movable element includes camming means, said camming means acts on said at least one positioning element during said rotational movement of said second movable element in said third direction and in said fourth direction.

10. The movement transmission system motor vehicle ventilation system according to claim 2, wherein at least one set of said wire ends of said first wire and said second wire are joined.

* * * * *